United States Patent [19]

Moyer

[11] Patent Number: 4,939,819
[45] Date of Patent: Jul. 10, 1990

[54] WRAPAROUND CLOSURE DEVICE

[75] Inventor: James D. Moyer, Downington, Pa.

[73] Assignee: The Bentley-Harris Manufacturing Company, Lionville, Pa.

[21] Appl. No.: 372,893

[22] Filed: Jun. 28, 1989

[51] Int. Cl.⁵ .............................................. B65D 63/00
[52] U.S. Cl. ..................................... 24/16 R; 24/587
[58] Field of Search ............ 24/16 R, 17 AP, 30.5 P, 24/576, 587, 3 M, 298, 300; 224/150; 128/D15

[56] References Cited

U.S. PATENT DOCUMENTS

| | | |
|---|---|---|
| Re. 24,613 | 3/1959 | Hageltorn . |
| Re. 29,331 | 8/1977 | Naito ................................ 24/587 |
| 1,498,126 | 6/1924 | Smith ................................ 24/573 |
| 2,212,267 | 8/1940 | Hudson .............................. 24/40 |
| 2,585,054 | 2/1952 | Stachura . |
| 2,756,172 | 7/1956 | Kidd . |
| 2,941,027 | 6/1960 | Svec . |
| 2,960,561 | 11/1960 | Plummer . |
| 3,038,205 | 6/1962 | Plummer . |
| 3,054,434 | 9/1962 | Ausnit et al. . |
| 3,089,915 | 5/1963 | Plummer . |
| 3,158,181 | 11/1964 | Gore . |
| 3,226,787 | 1/1966 | Ausnit . |
| 3,254,678 | 6/1966 | Plummer . |
| 3,338,284 | 8/1967 | Ausnit .............................. 24/587 |
| 3,413,406 | 11/1968 | Plummer . |
| 3,455,336 | 7/1969 | Ellis . |
| 3,495,306 | 2/1970 | Eichberg .......................... 24/576 |
| 3,551,200 | 12/1970 | Stivers . |
| 3,582,532 | 6/1971 | Plummer . |
| 3,654,049 | 4/1972 | Ausnit . |
| 3,667,921 | 6/1972 | Grodkiewicz et al. . |
| 3,751,398 | 8/1973 | Dahl . |
| 3,847,867 | 11/1974 | Heath et al. . |
| 3,914,298 | 10/1975 | Dahl . |
| 3,953,400 | 4/1976 | Dahl . |
| 3,965,146 | 6/1976 | Dahl . |
| 3,968,015 | 7/1976 | Nyberg . |
| 4,024,314 | 5/1977 | Dahl . |
| 4,073,830 | 2/1978 | Nyberg . |
| 4,111,908 | 9/1978 | Dahl . |
| 4,113,594 | 9/1978 | Nyberg . |
| 4,229,564 | 10/1980 | Dahl . |
| 4,249,686 | 2/1981 | Morwood ...................... 224/150 |
| 4,281,211 | 7/1981 | Tatum et al. . |
| 4,734,542 | 3/1988 | Klein . |
| 4,832,768 | 5/1989 | Takahashi ...................... 24/576 |

FOREIGN PATENT DOCUMENTS

| | | | |
|---|---|---|---|
| 0685848 | 5/1964 | Canada ........................... 24/17 AP |
| 0376328 | 5/1964 | Switzerland ..................... 24/587 |
| 0898124 | 6/1962 | United Kingdom ............. 24/587 |
| 1092453 | 11/1967 | United Kingdom ............. 24/587 |
| 1120131 | 7/1968 | United Kingdom . |
| 1438729 | 6/1976 | United Kingdom ............. 24/587 |
| 1529351 | 10/1978 | United Kingdom . |

*Primary Examiner*—Victor N. Sakran
*Attorney, Agent, or Firm*—John T. Synnestvedt; Charles H. Lindrooth

[57] ABSTRACT

A wraparound closure device which includes an axially compressible, radially expansible tube which is made from a fabric of engineered plastic. The tube may be braided on a circular or flat braider. If braided as a tube it is axially split to define a first and a second mating edge. Fastening means are sewn to the mating edges for selectively opening and closing the tube. The fastening means is fixed in length and thereby when it is connected to the tubular member, the tubular member is also fixed in length. However, the tubular member remains radially variable and expands and contracts to adapt to the shape of a substrate to be enclosed.

3 Claims, 2 Drawing Sheets

U.S. Patent Jul. 10, 1990 Sheet 1 of 2 4,939,819
FIG. 1
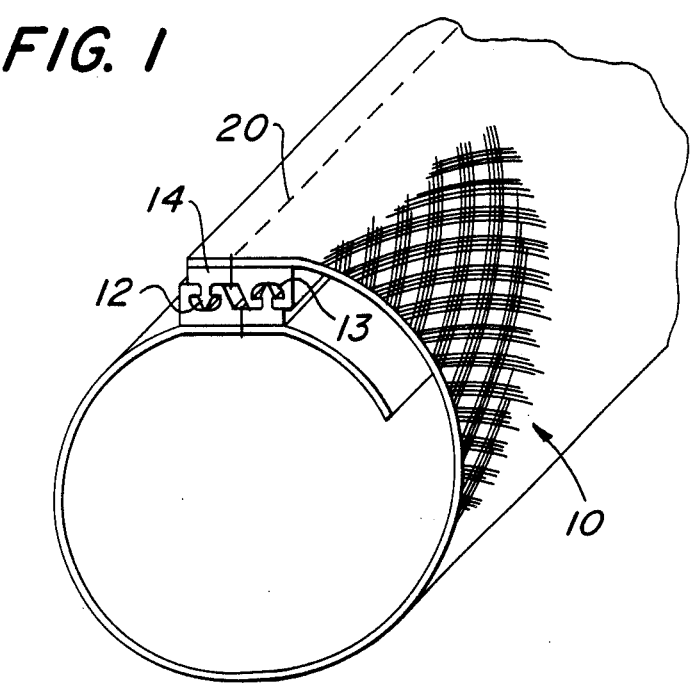
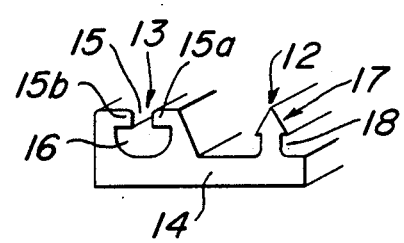
FIG. 2

WRAPAROUND CLOSURE DEVICE

FIELD OF THE INVENTION

This invention relates to a wraparound closure device made from flexible yieldable material such as woven fabric. More particularly, this invention relates to a fastener system useful for wraparound closures and particularly to wraparound closures which are flexible and radially expandable for protection of elongate substrates from abrasion and for facilitating the handling of such substrates

BACKGROUND OF THE INVENTION

Manufacturers and users of electrical cables and similar elongate articles have a need to protect such articles from the effects of abrasion. As is well established, abrasion inhibits a cable's performance, and, if severe enough, may lead to a failure in the system employing such a cable. Additionally, safety considerations warrant that electrical cables and the like maintain their mechanical and electrical integrity. For example, if an outer dielectric of a cable becomes frayed, for instance from abrasion, electrical shock and serious injury or short circuits may occur.

Additionally, manufacturers and users of cables and similar elongate substrates require a device which can be used to bundle cables. Bundling cables in a tight package reduces the abrasiveness of one cable against another Cables very often have an irregular diameter A joint, splice, mend or the like causes a cable to have a larger diameter at one section than another. Additionally, within the bundle there may be many different irregular diameters at various sections of each cable or there may be one particular section, such as at a joint where all of the cables have an enlarged diameter An effective bundling device must be able to handle these diametric irregularities.

Very often in an electrical or fluid system there will be need for a cable or hose or the like to be separated from the main stream of such elongate substrates. These points or sections of the system are known as break-out points or simply break-outs. An effective bundling device must be able to accommodate not simply one break-out but a series of such break-outs known as multiple break-outs.

Ideally, manufactures and users of cable and other similar elongate substrates, desire to have the abrasion resistant protection and the bundling function performed by a single device.

In order to satisfy industry needs with respect to both abrasion and bundling there has been developed a number of products. One particular product is made by Bentley-Harris Manufacturing Company of Lionville, Pa. and sold under the federally registered trademark EXPANDO. Expando sleeving is a braided tubular article made from a strong plastic material, such as polyester.

The EXPANDO sleeve or sleeving functions similarly to a "chinese finger" in that it is axially compressible and radially expansible and vice versa. In use, the cables or similar articles are loaded into the sleeving by axially compressing the sleeving which causes the sleeving to radially expand. In addition, the overall length of the sleeving decreases in direct proportion to its radial expansion.

EXPANDO sleeving is very often used for bundling. A number of cables are loaded into the sleeving with the sleeve in its axially compressed and radially expanded condition. After loading, the sleeve is axially expanded and radially compressed to firmly hold the cables of the bundle in fixed relation to one another.

The EXPANDO sleeving prevents abrasion of the cable during installation by providing an outer surface other than the cable's own protective surface which can absorb the mechanical abuse of such installation. During use, the sleeving prevents one cable from rubbing against another cable by providing this protective outer layer between the cables. In bundling applications, the sleeving fixes the position of one cable relative to another cable and thereby prevents internal bundle abrasion in use and installation.

A product intended to simplify installation and to facilitate cable break out while preserving important advantages of the Expando sleeving is sold by Bentley-Harris under the trademark EXPANDO ZIP. This braided product is provided with a zipper type fastening device which is fusion welded to the side edges of a ribbon of braided material and is intended to be wrapped around a bundle of cables or tubes and closed with a closure tool.

SUMMARY AND OBJECTS OF THE INVENTION

An object of this invention is to provide a simple and effective closure for a variable diameter wraparound sleeve for protecting elongate substrates, such as cables, tubing and the like, from abrasion.

Another object of this invention is to provide such a wraparound sleeve having a closure which facilitates use in the bundling of elongate substrates after final installation of same.

Another object of the invention is the provision of wraparound sleeving having a simplified, economical closure, openable and closable without a special tool and which may be readily and permanently attachable by conventional sewing techniques.

To accomplish the objects of the invention as set forth above and other objects and advantages of the invention as set forth hereinafter, the instant invention of an abrasion resistant variable diameter closure device, preferably comprises an axially compressible radially expansible tubular member, the member being made from a fabric of engineering plastic, the member defining first and second mating edges and fastening means connected to the mating edges for selectively opening and closing the member, the fastening means being of a fixed length, thereby the radius of the member expands and contracts, adapting to irregularly-shaped substrates.

The device of the instant invention is particularly useful where the elongate substrate to be enclosed is already finally installed. For example, where a system of cables have already been connected to the device and the power supply for the device, it is highly undesirable to disconnect the cable and slip on sleeving. It is far more efficient to use a wraparound sleeve which enclosed the cables that have been finally installed. The user merely wraps the device of the instant invention around the cables, fastens the member closed the desired length and the cables are both bundled and protected from abrasion.

In the case where the cables are of irregular diameters, the member expands and contracts diametrically to accommodate such irregularities. Thus, where there is a splice in a number of cables to be bundled by the instant invention, the member bulges at that section while remaining fixed in length.

The closure means comprises interlocking molded or extruded strips of flexible plastic material each having a pair of interengagement elements which are spaced apart and run lengthwise of the strip. One of the interengagement elements is a female, or grooved element and the other a projecting beaded element. The space between the two interengagement elements provides a continuously running zone which allows for attachment of the strip to the side edge of the web of material by stitching. The use of the interlocking strips of the present invention allows for multiple linking of a plurality of sheets of web material thereby forming tubes of one, two or more webs to accommodate a variety of bundle sizes. Although the sleeve may be formed of other flexible materials a preferable material is an open braid comprised of filaments of engineered plastic.

The cable or cables to be broken out are slipped through that section of the interlocking strips which has been selectively left open.

It is particularly useful to form the member by braiding it from filaments of engineered plastic materials. Materials in the family of engineered plastics include plastics that have a tensile modulus of greater than 50,000 psi. Examples of engineering plastics are the olefin polymers of which are poly 4-methyl pentene and fluorinated polyolefins for ethylene-tetrafluoroethylene copolymers, and vinylidene fluoride polymers especially polyvinylidene fluoride and blends thereof, for example, the fluorinated olefin blends as described and claimed in British Pat. No. 1,120,131 polyesters, for example, polyethylene terephthalate, polytetramethylene terephathalate for example that treated as described in U.S. Pat. Nos. 3,968,015; 4,073,830; and 4,113,594, polyphenyleneoxide and -sulphide, blends of polyethylene oxide with styrene, silicone-carbonate block copolymers, polyketones, such as polyarylether ketones, for example, those described and claimed in U.S. Pat. Nos. 3,953,400; 4,024,314; 4,229,564; 3,751,398; 3,914,298; 3,965,146; and 4,111,908, polysulphones, for example, polyaryl sulphones, polyarylethere sulphones, polyetherimides, for example those described in U.S. Pat. No. 3,847,867, polycarbonates especially those derived from bis phenol-A, polyamides, especially those described and claimed in U.S. Pat. Nos. 3,551,200 and 3,677,921, epoxy resins and blends of one or more of the above mentioned polymeric materials either with each other or with other polymeric materials. A more detailed discussion of the above materials is found in British Specification No. 1,529,351 which is incorporated herein by reference. It is especially preferred to use polyester as the material for the fiber.

A preferred method of making the instant invention includes connecting the fastening means to the member by sewing it to a braided sheet.

BRIEF DESCRIPTION OF THE DRAWINGS

The foregoing, and various other objects and advantages of the invention will be appreciated more fully hereinafter with reference to the accompanying drawings wherein:

FIG. 1 shows a braided sleeve incorporating the closure device of the instant invention;

FIG. 2 is a cross sectional view on an enlarged scale, of the closure in FIG. 1.

DETAILED DESCRIPTION OF THE PREFERRED EMBODIMENT

Figure 3A:
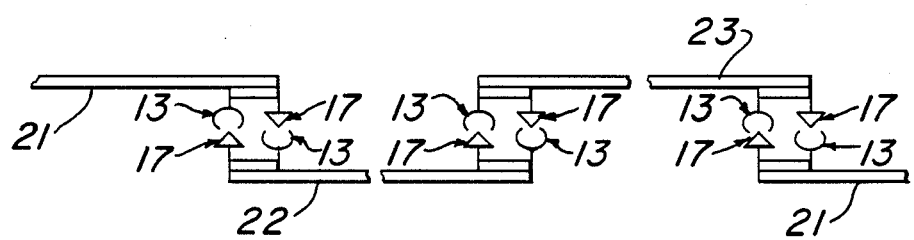
FIGS. 3A-3D illustrate in schematic form the linkage of strips or webs equipped with the closure means of the present invention.

Referring to the drawings, there is shown in FIG. 1 a wraparound sleeve generally indicated by the reference character 10. As illustrated in FIG. 1, the sleeve is shown in its wraparound configuration. However, the substrates, which may be wires, cables or tubes are omitted from FIG. 1 for simplicity of illustration. Sleeve 10 is preferably formed by braiding on either a flat or circular braider by use of braiding techniques well understood in the art. Although other materials may be employed for the accomplishment of certain of the objectives of the invention, the sleeving is preferably formed of strand made up of a plurality of ends of monofilament formed from engineered plastic materials. These materials, particularly in the braided form, allow for radial expansion when the sleeve is wrapped around an elongate substrate and provide conformity to irregularities in the cross sectional shape of the substrate as for example where connectors are encountered.

In accordance with the invention, the closure means comprises plural elongated interlocking strips of flexible plastic material, each strip being of identical configuration and comprising a pair of interengagement elements 12 and 13 which are spaced apart by a web portion 14 as best shown in FIG. 2. As can be seen in FIG. 2, one of the two engagement elements is a female element comprised of relatively narrow entry groove 15 defined by a pair of inwardly projecting, flexible flange portions 15a and 15B and an enlarged interior portion 16. Projecting male portion 12 consists of an enlarged bead portion 17 followed by a relatively narrow neck portion 18 which is integrally joined to the web 14.

In carrying out the invention, the interlocking strips are secured lengthwise of the web of the material in spaced apart parallel relationship, preferably by stitching through web 14 directly to the sleeve as shown at 20 in FIG. 1.

Figure 3B:
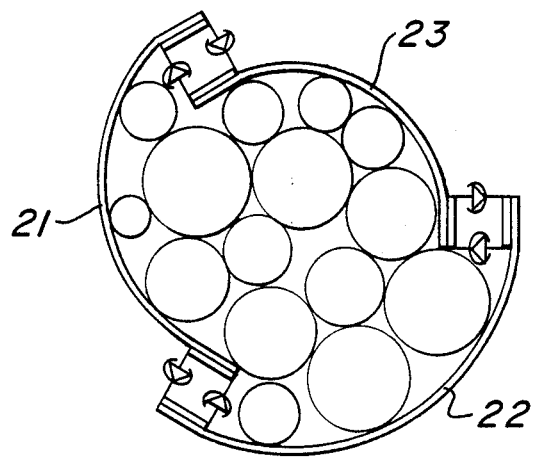
Figure 3C:
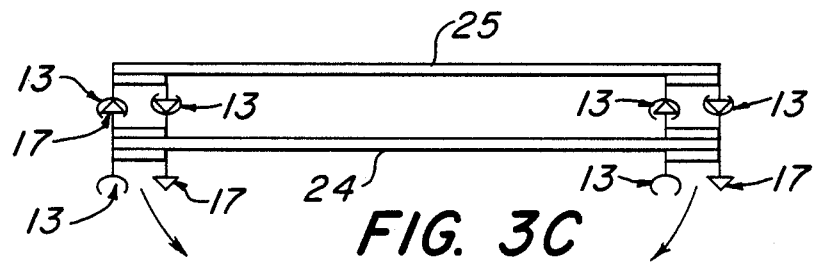

Preferably bead 17 is provided with an arrow-shaped profile so as to facilitate insertion between flanges 15a and 15b of the opposing entry groove 15. The material of the flanges should be relatively yieldable so as to allow interengagement of the parts with a modest amount of finger pressure and should thereafter positively snap over the arrow shaped bead portion so as to firmly hold it in place. Extrusion grade PVC has been found to be satisfactory for use in forming the elongated closure elements of the invention FIGS. 3A-3B show in schematic form how a plurality of webs of sheet material 21, 22 and 23 may be interconnected to form a sleeve of predetermined diameter using the interlocking closure means of the present invention. Similarly FIG. 3C illustrates the use of the closure means to form a edouble-walled wraparound sleeve comprised of webs 24 and 25. With the bottom pair of closure strips removed, the sleeve of FIG. 3C may be used for flat substrates which would be enclosed between webs 24 and 25.

Figure 3D:
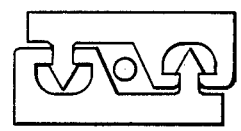

In an alternative application shown in FIG. 3D, the closure strips themselves may serve as a small sleeve capable of housing substrates such as tubes, wires or optical fibers within the space bounded by the closures 12 and 13 and the webs 14.

I claim:

1. A closure device for a wraparound sleeve said sleeve being formed of interleaved monofilament material formed into an open web of flexible stretchable material, said closure device comprising a pair of interlocking closure strips extending lengthwise of the web, said strips being in spaced apart, parallel relationship, each said closure strip having a projecting enlarged male bead element running lengthwise thereof and a groove female receptacle portion extending lengthwise thereof, a stitching web between said bead element and the receptacle element for stitching the closure device to the web of flexible material along the side edges thereof, said web maintaining said receptacle element in spaced apart relationship with said projecting bead element, the bead element on each of said closure elements being adapted to interfit with the groove in said receptacle portion on the other closure element, the groove having side flanges adapted to retain the bead element.

2. A closure device according to claim 1 wherein said sleeve is formed from a web of braided engineered plastic monofilament material.

3. A closure device according to claim 2 wherein said side flange portions define a relatively narrow entrance groove, a relatively larger interior receptacle portion communicating with said entrance groove, said entrance groove having a width narrower than the bead and being yieldable to allow passage of the bead element into and out of the receptacle portion.

* * * * *